United States Patent
Codd et al.

(10) Patent No.: US 9,094,591 B2
(45) Date of Patent: Jul. 28, 2015

(54) CAMERA SUPPORT APPARATUS

(71) Applicant: VITEC GROUP PLC, Suffolk (GB)

(72) Inventors: Andrew Codd, Suffolk (GB); Richard Arthur Lindsay, Suffolk (GB)

(73) Assignee: Vitec Group PLC, Suffolk (GB)

( * ) Notice: Subject to any disclaimer, the term of this patent is extended or adjusted under 35 U.S.C. 154(b) by 0 days.

(21) Appl. No.: 14/323,234

(22) Filed: Jul. 3, 2014

(65) Prior Publication Data

US 2014/0313405 A1    Oct. 23, 2014

Related U.S. Application Data

(62) Division of application No. 13/654,972, filed on Oct. 18, 2012, now Pat. No. 8,970,778.

(30) Foreign Application Priority Data

Oct. 19, 2011    (GB) .................................. 1117995.9

(51) Int. Cl.
| | | |
|---|---|---|
| H04N 5/225 | (2006.01) | |
| H04N 5/228 | (2006.01) | |
| F16M 11/10 | (2006.01) | |
| F16M 11/18 | (2006.01) | |
| F16M 11/20 | (2006.01) | |
| B66F 11/04 | (2006.01) | |

(52) U.S. Cl.
CPC ............ *H04N 5/2251* (2013.01); *B66F 11/048* (2013.01); *F16M 11/10* (2013.01); *F16M 11/18* (2013.01); *F16M 11/2014* (2013.01)

(58) Field of Classification Search
CPC . H04N 21/4305; H04N 5/222; H04N 5/2224; H04N 5/2254; H04N 5/2259

USPC ............................ 348/208.1–208.4, 373–374
See application file for complete search history.

(56) References Cited

U.S. PATENT DOCUMENTS

| | | | |
|---|---|---|---|
| 4,233,634 A | 11/1980 | Adams | |
| 5,170,197 A | 12/1992 | Schmidt et al. | |
| 5,220,848 A | 6/1993 | Basilico | |
| 5,598,207 A | 1/1997 | Kormos et al. | |
| 6,628,338 B1 | 9/2003 | Elberbaum et al. | |
| 7,130,186 B2 * | 10/2006 | Yu | 361/679.27 |
| 7,736,071 B2 | 6/2010 | Wahl et al. | |
| 7,800,648 B2 * | 9/2010 | Lu et al. | 348/207.1 |
| 8,410,623 B2 | 4/2013 | Stockner | |
| 2005/0154549 A1 | 7/2005 | Lin et al. | |

(Continued)

OTHER PUBLICATIONS

Office Action dated Jul. 16, 2014, issued in U.S. Appl. No. 13/654,972, filed Oct. 18, 2012.

(Continued)

*Primary Examiner* — Trung Diep
(74) *Attorney, Agent, or Firm* — Workman Nydegger

(57) ABSTRACT

A camera support apparatus for supporting a video camera comprises a drive train device (1), a first inductive position sensor (23), (14) attached to a rotational output device (11) of the drive train device (10), and a second inductive position sensor (2), (3) attached to a rotational input device (4) which is operably connected to the drive train device (1), whereby the inductance sensed by the first position sensor (23), (14) is indicative of the rotational displacement of the rotational output device (11) and the inductance sensed by the second position sensor (2), (3) is indicative of the rotational displacement of the rotational input device (4).

14 Claims, 4 Drawing Sheets

(56) References Cited

U.S. PATENT DOCUMENTS

2009/0180202 A1* 7/2009 Knoedgen ..................... 359/824
2012/0293671 A1 11/2012 Chan et al.

OTHER PUBLICATIONS

Notice of allowance dated Jan. 5, 2015, issued in U.S. Appl. No. 13/654,972, filed Oct. 18, 2012.

* cited by examiner

CAMERA SUPPORT APPARATUS

CROSS-REFERENCE TO RELATED APPLICATIONS

The present application is a divisional of U.S. application Ser. No. 13/654,972, filed Oct. 18, 2012, which claims priority to United Kingdom Application No. 1117995.9 filed Oct. 19, 2011, which applications are incorporated herein by specific reference.

BACKGROUND OF THE INVENTION

Field of the Invention

The invention relates to a camera support apparatus, in particular to a camera support incorporating a drive train with position sensors for the precise positioning of a supported professional camera, such as a television camera or the like.

In the context of the application the term "camera pedestal" defines all camera supports, such as pedestals, dollies, tripods, which are controlled either manually or automatically (i.e., via a robotic means).

Problem to the Solved

It is known that there is a problem of precisely positioning a supported professional video camera to repeatable positions. Known drive units require at least two optical encoders to provide accurate levels of data resolution for the absolute positioning of the input shaft and/or output shaft of a drive train unit, which in use, is typically incorporated within a robotic pan and tilt head, a robotic pedestal, a manual pan/tilt head or a manual pedestal for the television/film industry.

A second problem is the measuring of the position of the supported professional video camera to a high degree of accuracy, known solutions requires the use of optical encoders.

Furthermore, the uses of optical encoders with a camera support have the following disadvantages:
  Sensitive to contamination and humidity, therefore making the camera support equipment in which they are installed also sensitive to contamination and humidity. This increases the maintenance required for the camera support equipment and increases the associated long-term costs for the camera support equipment.
  Sensitive to axial misalignment, which complicates the manufacture of the associated camera support equipment.
  Sensitive to shock and vibrations, which reduces the robustness of the associated camera support equipment.

The invention seeks to provide a remedy/solution for these problems.

SUMMARY OF THE INVENTION

In a first broad independent aspect, the invention provides a camera support apparatus for supporting a video camera comprising a drive train means, a first inductive position sensor attached to a rotational output means of said drive train means, and a second inductive position sensor attached to a rotational input device which is operably connected to said drive train means, whereby the inductance sensed by said first position sensor is indicative of the rotational displacement of said rotational output means and the inductance sensed by said second position sensor is indicative of the rotational displacement of said rotational input device.

The advantage of this configuration is that it provides an accurate means to determine the rotational displacement of both the input shaft and output shaft of a drive train unit incorporated with in a camera support. The positioning of both the input and output shafts of the drive train unit varies the inductances sensed by both inductive sensors positioned at the input shaft and output shaft of the drive train unit. The magnetic field, in which the inductance is sensed is continuous and provides high resolution data for determining the absolute rotational position of each shaft. Therefore, enabling a control system to adjust the rotational input from a rotational input device, such as an electric motor, by a predetermined amount to ensure the output shaft is rotated to an exact position, which subsequently positions the supported video camera to a precise, repeatable position.

Preferably, said first inductive position sensor further comprises a first body member that is a passive inductive member and a second body member that is an active member incorporating a plurality of windings, whereby in use, the inductance of said windings is indicative of the position of said passive inductive member displaced along a rotating measurement path. This configuration enables the first inductive sensor to be located at the output of the drive train unit. The windings of the second body member to provide a magnetic field, which functions as an antenna for outputting high resolution data that is indicative of the relative rotational positioning of the passive first body member within the magnetic field.

Preferably, said first body member of said first inductive position sensor is a rotator attached to a final drive element of said drive train means. This enables the first inductive sensor to determine the rotational displacement of the output shaft of the drive train unit by forming the passive first body member into a rotor, which when attached to the final drive element of the drive train unit, accurately tracks the rotational displacement of the final drive train element within the magnetic field of the second body member of the sensor.

Preferably, said second body member of said first inductive position sensor is a stator attached to a supporting member, which in use attaches said drive train means to a pan and tilt head. This enables the first inductive sensor to determine the rotational displacement of the output shaft of the drive train unit, by attaching the stator to the supporting member which maintains the stator in a static position and generates an antenna magnetic field which senses the rotational displacement of the rotor attached to the output shaft of the drive train unit, within the antenna magnetic field, therefore enabling the sensor to output data which accurately represents the rotational displacement of the sensor's rotor, along a rotational path.

Preferably, the camera support apparatus further comprises a first non-metallic spacer that is located between said final drive element of said drive train means and said first body member of first inductive position sensor. This configuration avoids the metallic mass of the final drive element, which is a gear drive from affecting the magnetic field that the encoder uses to detect the position of the rotor. The plastic spacer separates the rotor of the first encoder and the gear drive.

Preferably, a camera support apparatus further comprising a second non-metallic spacer that is located between said supporting member and said second body member of said first inductive position sensor. This avoids the metal mass of the body of the support member from affecting the magnetic field which the first encoder uses to detect the position of the rotor. A plastic spacer is used to separate the stator and the body of the support member.

Preferably, said second inductive position sensor further comprises a first body member that is a passive inductive member and a second body member that is an active member incorporating a plurality of windings, whereby in use, the inductance of said windings is indicative of the position of said inductive member displaced along a rotating measurement path. This configuration enables the second inductive sensor to be located at the input of the drive train unit. The windings of the second body member provides a magnetic field which functions as an antenna which outputs high resolution data, that is indicative of the relative rotational positioning of the passive first body member within the magnetic field.

Preferably, said first body member of said second inductive position sensor is a rotor attached to said rotational input device. This enables the second inductive sensor to determine the rotational displacement of the input shaft of the drive train unit, by forming the passive first body member into a rotor, which when attached to the rotational input device, i.e., an electric motor, accurately tracks the rotational displacements of the input drive shaft.

Preferably, said second body member of said second inductive position sensor is a stator attached to a second supporting member attached to said drive train means. This enables the second inductive sensor to determine the rotational displacement of the input shaft from the drive train unit, by attaching the stator to the camera support apparatus which maintains the stator in a static position and generates a magnetic field which senses the rotational displacement of the rotor attached to the rotational input device within the antenna magnetic field, therefore enabling the sensor to output data which accurately represents the rotational displacement of the sensor's rotor, along a rotational path.

Preferably, a camera support apparatus further comprising a third non-metallic spacer that is located between said first body member of said second inductive position sensor and said rotational input device. This configuration prevents the electric magnetic fields generated by the rotations input device, i.e., the electric motor, from affecting the magnetic field which the encoder uses to detect the position of the rotor which is attached to the motor.

Preferably, a method of driving and supporting a pan and tilt head, further comprising a camera support apparatus as previously described.

Preferably, a pan and tilt head apparatus for supporting a video camera, further comprising a camera support apparatus as previously described.

Preferably, a robotic pedestal apparatus for supporting a video camera, further comprising a camera support apparatus as previously described.

Preferably, a manual pedestal apparatus for supporting a video camera, further comprising a camera support apparatus as previously described.

In a second broad independent aspect, the invention provides a camera support apparatus, which in use supports a video camera, the apparatus comprising a means of moving the supported camera along an axis and an inductive position sensor attached to said apparatus, whereby the inductance sensed by said position sensor is indicative of the displacement of said supported camera.

This configuration enables the camera support apparatus to have free movement along one axis, which is sensed by the inductive sensor, whereby the inductance sensed is indicative of the displacement of the camera along the axis. The output encoder determines and/or measures the absolute positioning of the camera, which is displace by a fixing plate or movement of the pedestal itself. The rotational position is measured in degrees. This is particularly advantageous for measuring and determining the absolute position of a pan and tilt head along the axis. Or alternatively, determining the absolute position of the steering and incremental distance moved by the wheels supporting/drive wheels of pedestal support and therefore calculating the pedestal's position across the floor in such applications as robotic navigation.

Preferably, a camera support apparatus further comprises a drive train which incorporates respective successive drive stages coupled together by means which cause rotational velocity of a rotational movement to be reduced across the drive stages thereby converting torque applied to an input of each drive stage into an increased torque at an out put of each drive stage, whereby one said successive drive stage incorporates a gear drive, characterised in that prior to said gear drive is another said stage incorporating a belt drive. This configuration provides a means of quietly communicating a high speed rotational velocity to the drive, which will not be picked up by any audio equipment located away from the supported camera.

Preferably, a camera support apparatus further comprises a second position sensor attached to a rotational input device which is operably connected to said drive train, whereby the position sensed by said second sensor is indicative of the rotational displacement of said input device along a rotating measurement path. The advantage of this configuration is that it provides an accurate means to determine the rotational displacement of the input shaft of the drive train unit incorporated within a camera support apparatus. The rotational positioning of the input shaft is rotational sensed by the second position sensor positioned at the input shaft of the drive train unit. The second position sensor provides high resolution data for determining the absolute rotational position of the input shaft. Therefore, enabling a control system to adjust the rotational input from a rotational input device, such as an electric motor, by a predetermined amount to ensure the output shaft is rotated to an exact position, which subsequently positions the supported video camera to a precise, repeatable position.

Preferably, said inductive sensor further comprises a first body member that is a passive inductive member and a second body member that is an active member incorporating a plurality of windings, whereby in use, the inductance of said windings is indicative of the position of said passive member displaced along a rotating measurement path. This configuration enables the inductive sensor to be located at the output of the drive train unit. The windings of the second body member to provide a magnetic field, which functions as an antenna for outputting high resolution data that is indicative of the relative rotational positioning of the passive first body member within the magnetic field.

Preferably, said first body member of said inductive position sensor is a rotor attached to a final drive element of said drive train means. This enables the inductive sensor to determine the rotational displacement of the output shaft of the drive train unit by forming the passive first body member into a rotor, which when attached to the final drive element of the drive train unit, accurately tracks the rotational displacement of the final drive train element within the magnetic field of the second body member of the sensor.

Preferably, said second body member of said first inductive sensor is a stator attached to a supporting member, which in use attaches said drive train to said apparatus. This enables the inductive sensor to determine the rotational displacement of the output shaft of the drive train unit, by attaching the stator to the supporting member which maintains the stator in a static position and generates an antenna magnetic field which senses the rotational displacement of the rotor attached to the output shaft of the drive train unit, within the antenna magnetic field, therefore enabling the sensor to output data which accurately represents the rotational displacement of the sensor's rotor, along a rotational path.

Preferably, a pan and tilt head comprising the above apparatus, wherein the rotational displacement of a supported camera about a vertical axis is sensed along a rotating measurement path. This configuration enables the supported camera to be displaced along a 360 degree panoramic axis.

Preferably, a pan and tilt head comprising a second apparatus as above, wherein the rotational displacement of a supported camera about a horizontal axis is sensed along a rotational measurement path. This configuration enables the supported camera to be displaced along a vertical axis.

Preferably, a camera pedestal comprising the above apparatus. This configuration enables the pedestal to measure the distance travelled along a track.

Preferably, a camera pedestal comprising the above apparatus, wherein the rotational displacement of a ground engaging member is sensed along a rotating measurement path. The pedestal senses the ground engaging member, such as a wheel, to quantify the displacement of the pedestal.

Preferably, a crane comprising the above apparatus, wherein the rotational displacement of a crane arm about a horizontal axis is sensed along a rotating measurement path. This configuration enables the crane to quantify the displacement of the crane arm along a vertical axis.

Preferably, a crane comprising the above apparatus, wherein the rotational displacement of a crane arm about a vertical axis is sensed along a rotating measurement path. This configuration enables the crane to quantify the displacement of the crane arm along a horizontal axis.

In a third broad independent aspect the invention provides a camera support apparatus for supporting a video camera comprising a drive train, a first position sensor attached to a rotational output of said drive train; and a second position sensor attached to a rotational input which is operably connected to said drive train; wherein at least one of the sensors is an inductive sensor.

DETAILED DESCRIPTION OF THE FIGURES

Figure 1:
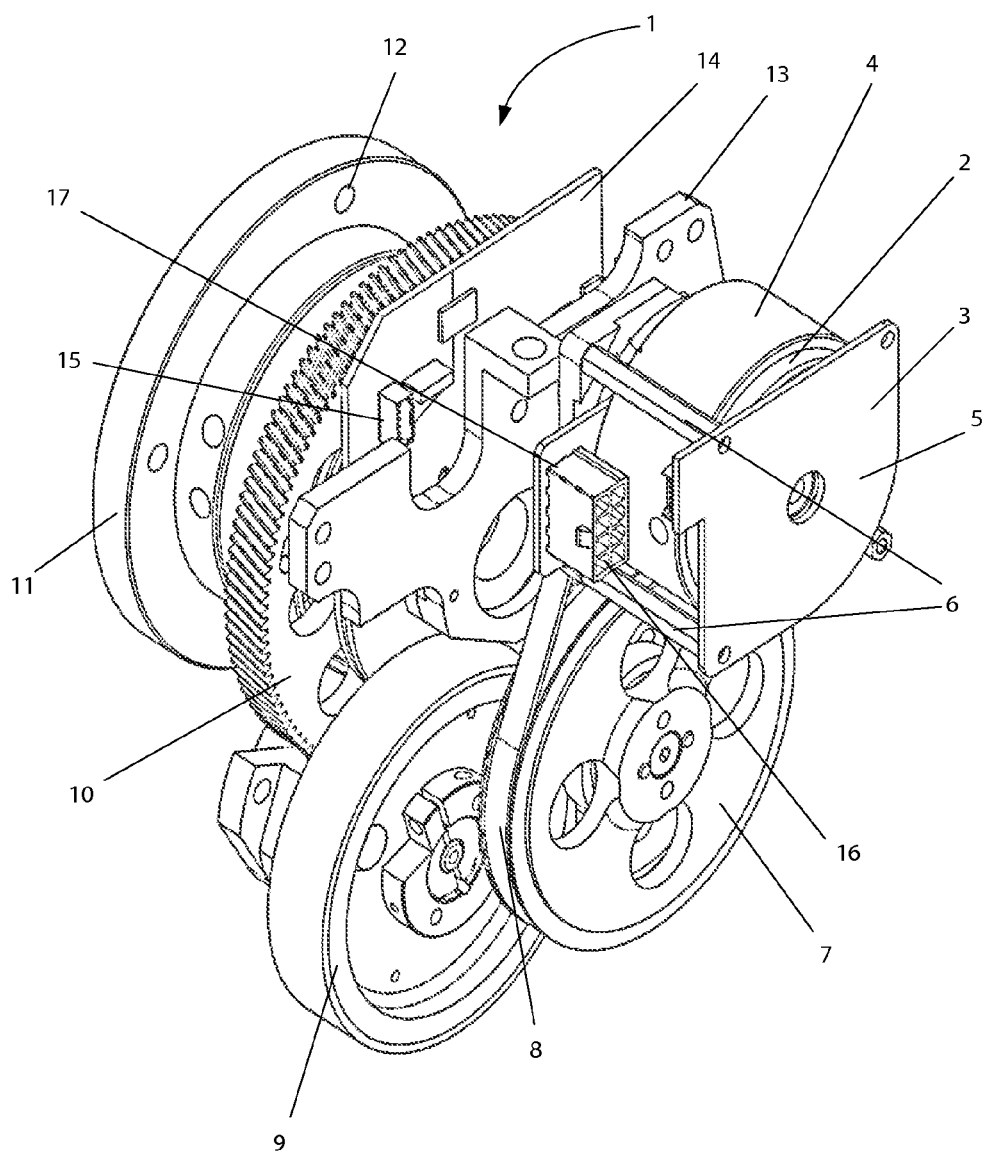
FIG. 1 shows a perspective illustration of the drive train unit incorporating two encoders.

FIG. 1 shows a perspective illustration of the drive train unit, generally indicated by 1. The drive train system 1 has an input encoder, which incorporates a rotor 2 which is attached to the rotating member of an input motor 4. The input encoder incorporates a stator member 3, which is attached to a supporting member 5 of the input motor 4 that is coupled to the drive train unit 1. The supporting member 5 is attached to the drive train unit 1, via elongated hexagonal supporting member 6 that space the supporting member 5 away from the input motor 4.

The input motor 4 is coupled to a first drive element 7 which is a pulley that is driven by a drive belt 8. The first drive element 7 then subsequently drives a second drive element 9, which is a friction drive pulley. The second drive element 9 is then coupled to a third drive element 10, which is a toothed gear wheel. The third drive element 10 is coupled to a round fixing plate 11 which facilitates the attachment of the drive train to a camera support such as a tripod, pedestal or the like. The fixing plate 11 incorporates a circular flange with an array of fixing holes 12 for attaching the drive train to the camera support.

Supporting member 13 of the drive train unit 1 is attached to the final drive element 10. The stator 14 of the output encoder is attached to the surface of the supporting member 13 that faces the final drive element 10. The stator 14 of the output encoder in formed from a printed circuit board, which incorporates an electrical connector 15. Supporting member 13 also incorporates an "L" fixing bracket with a 90° bend which enables the attachment of the drive train unit to a supporting surface or member.

A second electrical connector 16 is mounted on a second printed circuit board 17, which is attached to the end of the input motor 4, which is coupled to the drive unit 1.

Figure 2:
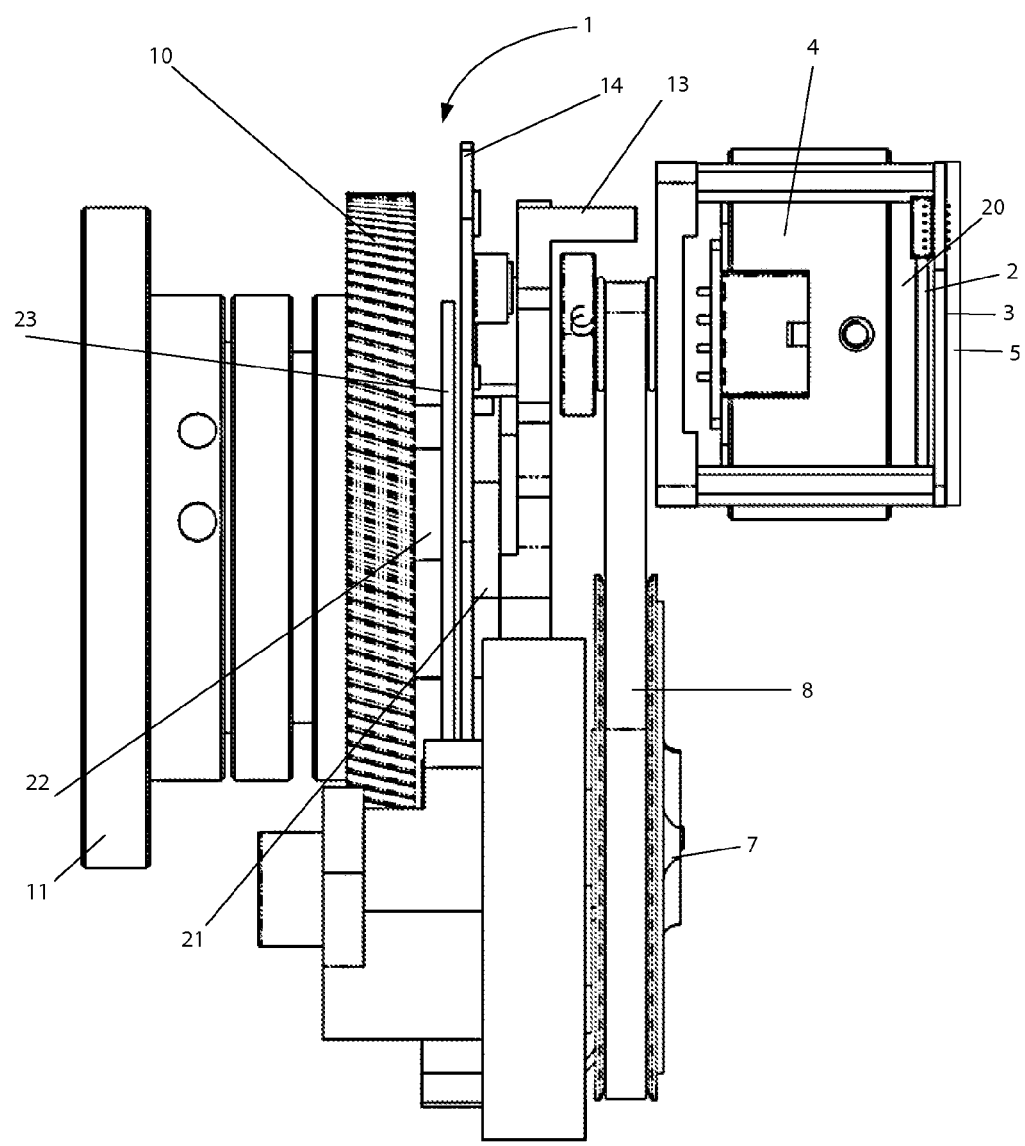
FIG. 2 shows a side illustration of the drive train unit incorporating two encoders.

FIG. 2 shows a side view illustration of the drive train system 1. The stator 3 of the input encoder is attached to the inside surface of the support member 5 which is attached at one end of the input motor 4 that is not coupled to the drive train unit 1. A plastic spacer 20 is located between the rotor 2 of the input encoder and the input motor 4. The input motor 4 is coupled to the first drive element 7 via a drive belt 8.

The stator 14 of the output encoder is attached to the inside surface of supporting member 13 that faces the third drive element 10. A non-metallic spacer 21 formed from plastic materials, is located between the stator 14 of the output encoder and the surface of the supporting member 13. The rotor 23 of the output encoder is attached to the output gear drive 10. A second non-metallic spacer 22 formed a plastic material is located between the rotor 23 of the output encoder and the geared output drive element 10.

In use, the rotational movement of the input encoder's rotor is sensed by a magnetic field generated by the windings of the input encoder's stator, which functions as an antenna. The inductance of the windings incorporated within the stator varies in proportion to the rotational position of the rotor moving along a rotational path. Therefore, the absolute positioning of the input motor's shaft can be determined.

The drive train communicates a rotational movement from the input motor to the first drive element. The first drive element then subsequently drives the second drive element, which is typically a friction drive. The friction drive then subsequently drives a third drive element which is typically a toothed output gear drive. The toothed gear drive provides a high torque, rotational movement for an attached fixing plate, which is then subsequently attached to a camera support.

The geared output drive element has an output encoder, which has a passive rotor that co-operates with a static stator. The rotational movement of the output encoder's rotor is sensed by a magnetic field generated by the windings of the output encoder's stator, which functions as an antenna. The inductance of the windings within the stator varies in proportion to the rotational position of the rotor attached to the final drive element to determine the rotational position of the fixing plate in relation to the rotational position of the drive motor.

Therefore, the output encoder determines/measures the absolute rotational positioning of the fixing plate; the rotational position is measured in degrees. Upon activation and the input encoder is reset to a zero value, which is then incremented or decremented in accordance with the in put rotation from the input motor. By incrementing or decrementing the incremental value of the in put encoder, the motor can be accurately positioned to a known position.

The advantages of using inductive encoders with the drive unit are:

- The encoder can fit around large diameter shafts allowing us to use large stiff shafts to maximise rigidity. This is beneficial for the rigidity of our pan/tilt heads, pedestals or other camera support equipment for use in the film and studio area;
- The encoder has small axial dimensions. This is beneficial for packaging our pan and tilt heads, pedestals or other camera support equipment for use in the film and studio area;
- Inductive encoders are not as sensitive to axial misalignment as optical encoder technology. This is beneficial as it ensures ease of assembly;
- Inductive encoders are not as sensitive to contamination and humidity as optical encoder technology. This is beneficial as it ensures our pan/tilt heads, pedestals or other camera support equipment for use in the film and studio areas are not sensitive to environmental conditions;
- They provide absolute position data to high resolution as required for the smooth, precise and repeatable moves required by pan/tilt heads, pedestals or other camera supporting equipment for use in film and studio area. Using optical encoders previously had to fit two optical encoders to achieve the same level of resolution and absolute positioning. One encoder for absolute positioning but low resolution and a second encoder for high resolution but is incremental in movement;
- Cost-effective encoder solutions help minimise the cost of the overall product;
- Low mass design helps minimise the weight of the overall product;
- Mechanically robust shock and vibration improves the robustness of the overall product.

In an alternative embodiment of the invention, the video camera is held and supported by a supporting apparatus. The supporting apparatus allows the movement of the supported camera along one axis of freedom (Free movement), and also incorporates an inductive position sensor which senses movement along the axis of freedom. The inductance sensed by the inductance sensor is indicative of the displacement of the camera along the axis of freedom; the displacement maybe typical of a rotational displacement type.

The supporting apparatus maybe typically a pan and tilt head (manual and/or robotic) which incorporates the inductive sensor to measure and determine the absolute position of the pan and tilt axis.

Or alternatively, the supporting apparatus maybe typically a supporting pedestal (manual/and/or robotic) which incorporates the inductive sensor to measure and determine the absolute position of the steering and the incremental distance moved by the supporting wheels of the pedestal. The absolute position is used to calculate and determine the pedestals position across the floor and is used in applications such as robotic navigation.

Figure 3:
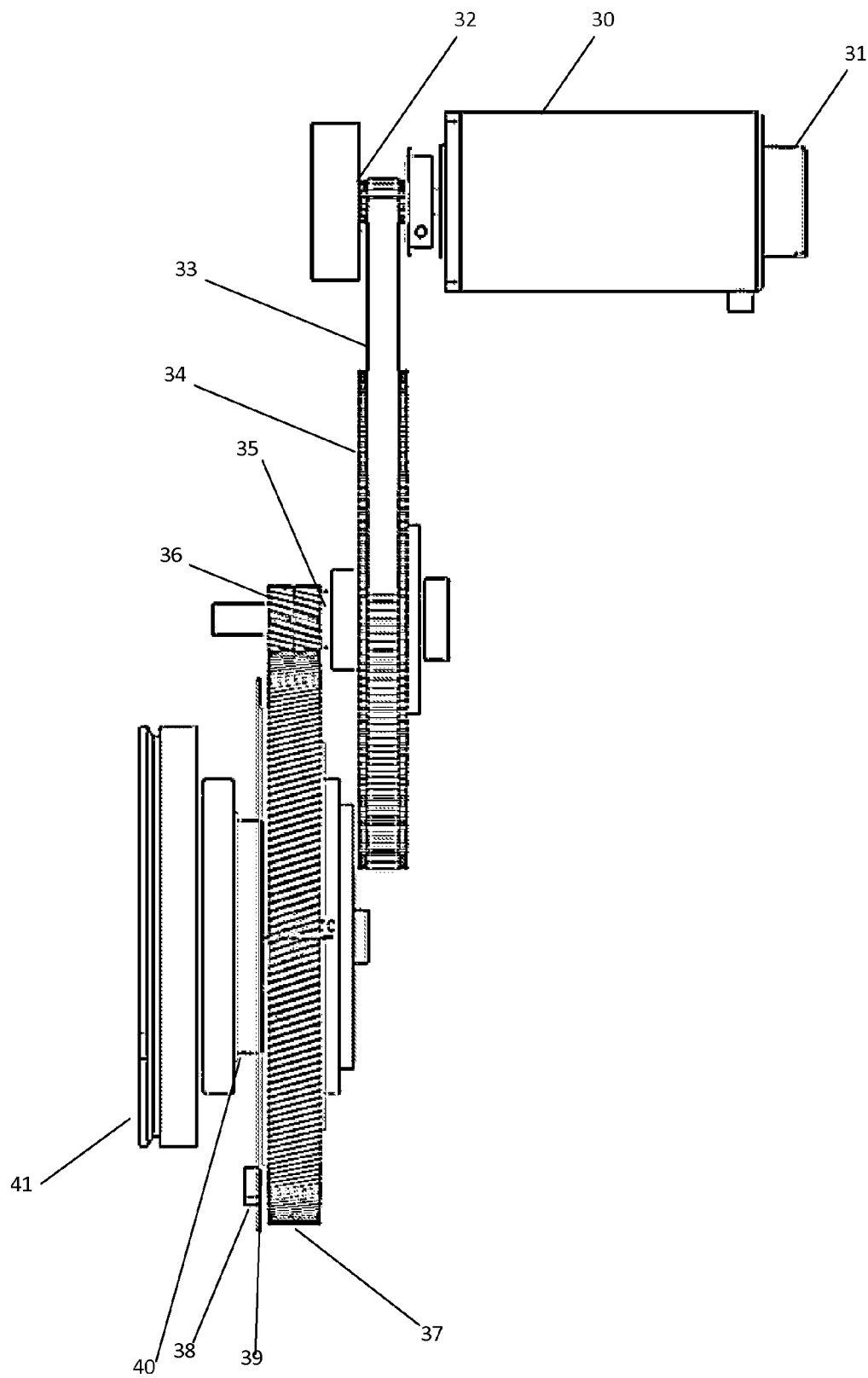
FIG. 3 shows a side illustration of an alternative embodiment of the drive unit incorporating two encoders.

FIG. 3 shows a side illustration of a drive train unit incorporating an input motor 30. Attached at one end of the input motor is an angular position measuring device 31, which may typically be an optical encoder or a hall sensor. The end of the input motor, opposite the attached sensor is operably connected to a first drive element consisting of: a small pulley 32, which drives a belt 33, which in turn drives a large pulley 34. The small pulley 32 is rigidly connected to the input motor 30. The first drive element reduces the torque from the input motor 30 and outputs it via the large pulley 34.

A drive shaft 35 which centrally protrudes from the large pulley 34 of the first drive element is operably connected to the input of a second drive element. The second drive element consists of a small gear 36 in mesh with a large gear 37. The small gear 36 is rigidly connected to the drive shaft 35. The second drive element reduces the torque from the first drive element and outputs it via a large gear 37.

A drive shaft 40 which centrally protrudes from the large gear 37 of the second drive element is operably connected to a round fixing plate 41. The round fixing plate 41 facilitates attachment of the drive train to a camera support, such as a tripod, pedestal or the like. The fixing plate 41 incorporates a circular flange with an array of fixing holes for attaching the drive train to the camera support.

An inductive output encoder consists of a stator 38 which is attached to the body work of the head (not shown) and a rotor 39 which protrudes centrally from, and is operably connected to a large gear 37 that forms the output of the second drive element.

Figure 4:
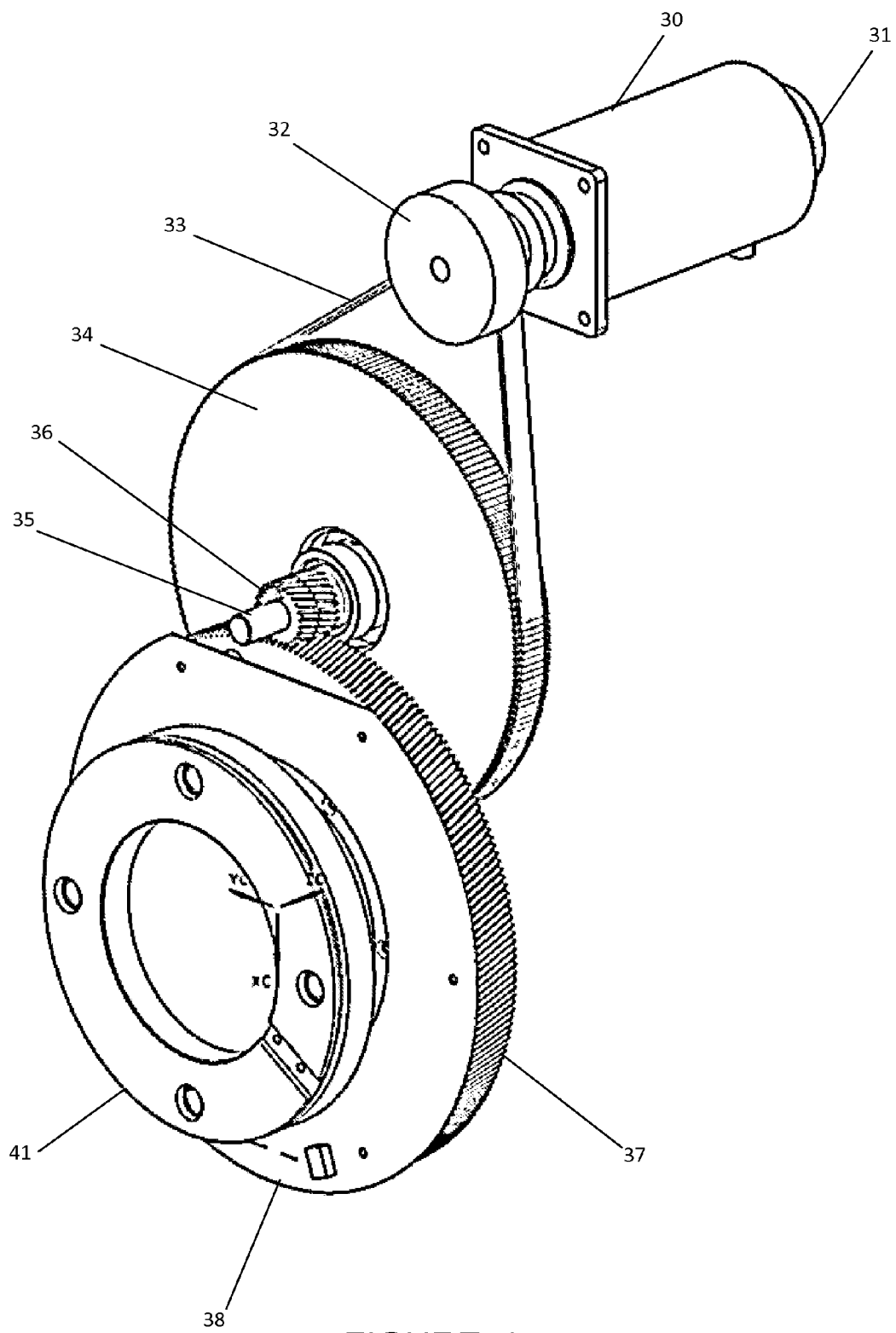
FIG. 4 shows a perspective illustration of an alternative embodiment of the drive unit incorporating two encoders.

FIG. 4 shows a perspective illustration of the same drive train unit as shown in FIG. 3.

In use, the drive train communicates a rotational movement from the input motor to the first drive element. The first drive element then subsequently drives the second drive element. The second drive element has an output encoder, which has a passive rotor that co-operates with a static stator. Rotational movement of the output encoder's rotor is sensed by a magnetic field generated by the windings of the output encoder's data, which functions as an antenna. The induction of the windings incorporated within the stater varies in proportion to the rotational position of the rotor attached to the final drive element to determine the rotational position of the fixing plate.

Therefore, the output encoder determines/measures the absolute rotational positioning of the fixing plates; the rotational position is also measured in degrees.

The alternative embodiments of the invention are:

Pan/tilt camera mount heads which move a mounted camera along both pan and tilt axes, whereby the apparatus of the claimed invention is a drive train and encoder, which moves the camera 360° about a panoramic axis. A virtually identical but separate drive train and encoder is incorporated into the head to move the supported camera about the tilt axis.

In another embodiment of the invention the drive train and encoder are incorporated within a robotic/manual pedestal, which senses the movement of a ground engaging wheel of a pedestal, along a track, to measure the distance travelled along the track. The pedestal and wheel can be driven by a robotic means, or just a rolling wheel, whereby the pedestal is pushed manually. The pedestal senses the wheel to measure the distance it has travelled across the floor and therefore deduce its position on the floor.

In an alternative embodiment of the invention the drive train and encoder are incorporated within a crane, which incorporates a sensor to detect the rotation of the crane arm about a vertical axis and a second sensor to detect the rotation of the crane arm about a horizontal axis, to measure and determine (i.e., calculate) the orientation of a supported camera along axes X, Y and Z. The crane arm can be driven, i.e., via a robotic means, or pushed manually. The crane could also be mounted on a track or pedestal to allow further movement.

In an alternative embodiment of the invention, the drive train and encoder can be incorporated within any camera support equipment with a drive to control and measure the movement along a single axis, whereby the measurement is determined by a single inductive sensor.

In another alternative embodiment of the invention, the drive train and encoder are incorporated with a camera support equipment with a manually controlled axis that needs to be measured, whereby the measure is determined by a single inductive sensor.

The camera support apparatus, which use supports a video camera, incorporates a means of moving the supported camera along an axis and an inductive position sensor attached to the apparatus; whereby the inductance sensed by the position sensor is indicative of the displacement of the supported camera. The means of moving the supported camera may be a robotic or manual pedestal, a manual or robotic dolly, a manual or robotic tripod, a manual or automatic pan and/or tilt camera mount head or a crane.

The invention claimed is:

1. A camera support apparatus, which in use supports a video camera, the apparatus comprising a means of moving the supported camera along an axis and an inductive position sensor attached to said apparatus, whereby the inductance sensed by said inductive position sensor is indicative of the displacement of said supported camera, the apparatus further comprising a drive train which incorporates respective successive drive stages coupled together by means for causing rotational velocity of a rotational movement to be reduced across the drive stages thereby converting torque applied to an input of each drive stage into an increased torque at an out-put of each drive stage, whereby one said successive drive stage incorporates a gear drive, wherein prior to said gear drive is another said stage incorporating a belt drive.

2. A camera support apparatus according to claim 1, wherein said axis is a linear axis.

3. A camera support apparatus according to claim 1, wherein said axis is a rotational axis.

4. An apparatus according to claim 1, further comprising a second position sensor attached to a rotational input device which is operably connected to said drive train, whereby the position sensed by said second sensor is indicative of the rotational displacement of said input device along a rotating measurement path.

5. An apparatus according to claim 1, wherein said inductive sensor further comprises a first body member that is a passive inductive member and a second body member that is an active member incorporating a plurality of windings, whereby in use, the inductance of said windings is indicative of the position of said passive member displaced along a rotating measurement path.

6. An apparatus according to claim 1, wherein said first body member of said inductive position sensor is a rotor attached to a final drive element of said drive train.

7. An apparatus according to claim 1, wherein said second body member of said first inductive sensor is a stator attached to a supporting member, which in use attaches said drive train to said apparatus.

8. A pan and tilt head comprising said apparatus in accordance with claim 1, wherein the rotational displacement of a supported camera about a vertical axis is sensed along a rotating measurement path.

9. A pan and tilt head comprising a second said apparatus in accordance with claim 1, wherein the rotational displacement of a supported camera about a horizontal axis is sensed along a rotating measurement path.

10. A camera pedestal comprising said apparatus in accordance with claim 1.

11. A camera pedestal comprising said apparatus in accordance with claim 1, wherein the rotational displacement of a ground engaging member is sensed along a rotating measurement path.

12. A crane comprising said apparatus in accordance with claim 1, wherein the rotational displacement of a crane arm about a horizontal axis is sensed along a rotating measurement path.

13. A crane comprising said apparatus in accordance with claim 1, wherein the rotational displacement of a crane arm about a vertical axis is sensed along a rotating measurement path.

14. A camera support apparatus for supporting a video camera comprising:
   a drive train;
   a first position sensor attached to a rotational output of said drive train; and
   a second position sensor attached to a rotational input which is operably connected to said drive train;
   wherein at least one of the sensors is an inductive sensor;
   the drive train incorporating respective successive drive stages coupled together by means for causing rotational velocity of a rotational movement to be reduced across the drive stages thereby converting torque applied to an input of each drive stage into an increased torque at an out-put of each drive stage, whereby one said successive drive stage incorporates a gear drive, wherein prior to said gear drive is another said stage incorporating a belt drive.

* * * * *